April 9, 1963 A. F. HEROLD 3,084,502
METHOD OF MAKING A CHAIN SIDE BAR HAVING FINISHED PIVOT HOLES
Filed Oct. 21, 1959
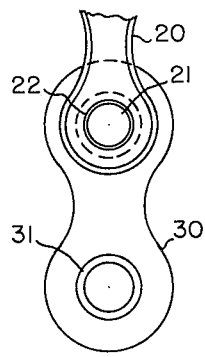
Fig. I
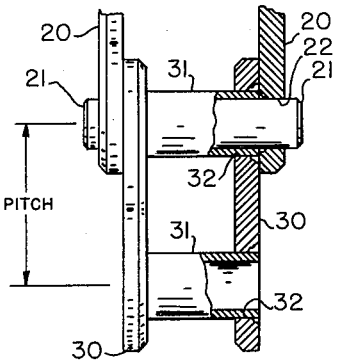
Fig. II
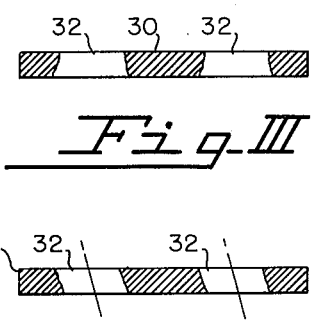
Fig. III
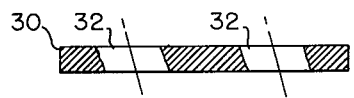
Fig. IV
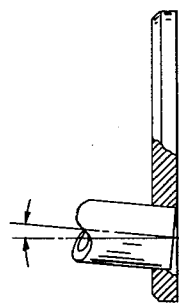
Fig. VII
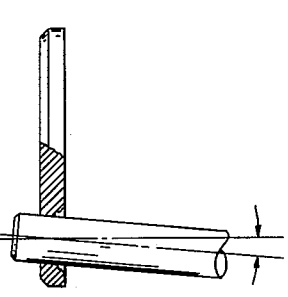
Fig. VIII
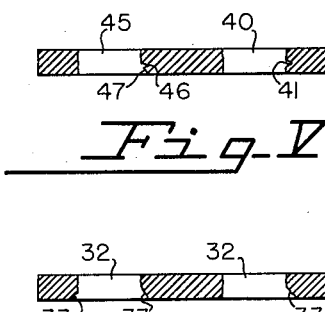
Fig. V
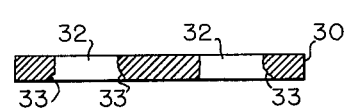
Fig. VI
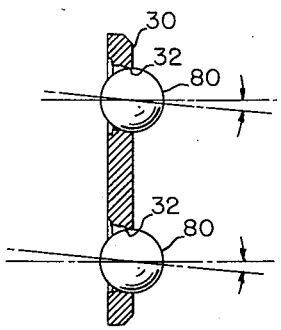
Fig. IX
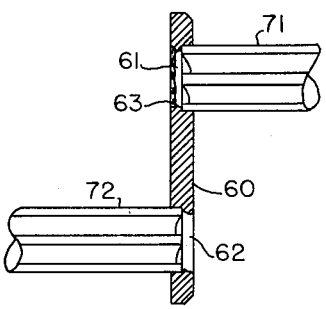
Fig. X
*INVENTOR.*
ALFRED F. HEROLD
BY
*Marshall, Marshall & Yeasting*
ATTORNEYS 3,084,502
METHOD OF MAKING A CHAIN SIDE BAR HAVING FINISHED PIVOT HOLES
Alfred F. Herold, Sandusky, Ohio, assignor, by mesne assignments, to Hewitt-Robins Incorporated, Stamford, Conn.
Filed Oct. 21, 1959, Ser. No. 847,786
1 Claim. (Cl. 59—8)

This invention relates to methods for increasing the endurance capacity and the strength capacity of chain in general and particularly with power transmission chains and conveyor chains in which the various elements such as the side bars, connecting bushings and pins, and rollers are formed separately and then assembled to attain a desired length of chain.

In the manufacture of component chain parts much has been accomplished in the field of metallurgy providing the chain industry with highly improved metals and alloys with which to work. The effectiveness of all metals when used in fashioning chains is limited by the methods which are utilized to form, finish and assemble the component parts and particularly the parts of the separate components which have load bearing surfaces that must cooperate with a load bearing surface of another component in the final assembly of the finished chain. As a result, research has been directed to methods for improving the quality of the components such as is described in U.S. Patent No. 2,778,094, issued January 22, 1957, and in general methods of increasing the fatigue strength of chain links such as in U.S. Patent No. 2,517,497, issued August 1, 1950. While the above referenced patents relate to improving the performance of component parts by prestressing the component parts at selected points, difficulties have still been encountered by failures of chain because of problems connected directly with the load bearing surfaces of the component parts.

It is accordingly an object of this invention to provide a method of increasing the strength capacity and the endurance capacity of chains by improving the load bearing surfaces of the component parts, particularly the connecting links or side bars, thus greatly improving the life and strength capacities of the finished product.

It is another object of this invention to provide a method of making chain which includes finishing the component parts to a desired smoothness and accuracy, increasing the area of the load bearing surfaces, improving the squareness with which the component parts can pull against these load bearing surfaces, and improving the pitch accuracy.

Other objects, features and advantages of the invention will become apparent when the following description is taken in conjunction with the accompanying drawings, in which:

FIG. I is a side view of an assembled link of chain;
FIG. II is a plan view of FIG. I partially in section so that the various components may be more readily identified;
FIGS. III, IV, V and VI are cross sectional views of side bars showing results of prior types of finishing;
FIGS. VII and VIII are partially cross sectional views of side bars showing the results of some of the types of finishes illustrated in FIGS. III through VI when assembled with a bushing and a pin respectively;
FIG. IX is a cross sectional view of a side bar illustrating a prior art method of finishing the holes formed in the side bar; and
FIG. X is a cross sectional view of a side bar illustrating the method of this invention.

Referring to FIGS. I and II there is shown a side view and a plan view of an assembled link of chain of a type to which this invention may be applied. Two outer side plates, pin links, plates or side bars 20 are connected by a pin 21 inserted in the aligned pin receiving holes 22 formed in each of the side bars 20. Two inner side bars 30 are connected by a bushing 31 which is inserted into aligned holes 32 formed in the inner side bars 30. A chain made from these component parts is assembled by first assembling two inner side bars 30 in press fit connection with two bushings 31 as shown in FIG. II and then inserting a pin 21, of which two are already assembled with a first outer side bar 20, inside of the bushing 31, the pin 21 then being connected with a second outer side bar 20. Although not shown in FIG. II, the pin 21, a press fit with the outer side bars 20, may be also maintained in position by riveting both ends of the pin 21 or riveting one end and utilizing a fastener such as a cotter pin to hold the other end in place. Also, although not shown in FIG. II, a roller may be assembled in place on the outside of the bushing 31.

As was discussed hereinbefore it is found that the fatigue rate of chains is directly related to the character of the load bearing surface formed in or on the component parts that go together to make up an assembled chain. If the load bearing surfaces receive the complete contact possible the load is distributed over a greater area thus reducing the unit stress on the load bearing surface.

In FIGS. III through VI there is illustrated various types of holes formed in either an inner or outer side bar that result from prior art methods of manufacturing. In FIG. III there is shown two tapered holes 32 that may result in the side bar 30 in a punching operation. That is, in a punching operation the punch employed is generally appreciably smaller than the mating die to provide the necessary break out because the punch is generally not forced through the full depth of the side bar material to make a smooth hole but instead a portion on the lower side is broken out. One method to remove or reduce the "taper" from punched holes in side bars is the "shaving" operation. That is, a punch slightly larger than the maximum diameter of the original punched holes is forced through the holes to remove a relatively small quantity of metal. The shaving operation of finishing the hole in the side bar falls in the category of "impact" type of finishing. The surface left by impact type finishing is a fracture surface resulting in a multiplicity of relatively small fractures and as a result is relatively rough and does not always give the smooth hole through the entire depth of the side bar. For example, a break out 33 around the edges of the holes 32 may result even though a shaving operation is utilized to remove the taper from the holes as shown in the cross sectional view of the side bar 30 in FIG. VI. Thus, the load bearing surface of the hole or aperture formed in the side bar is still reduced considerably below that which could be used.

The right hand hole or aperture 40 formed in the side bar illustrated in FIG. V shows another result of any punching, shaving or other impact type of finishing. Incipient stress risers or cracks or fractures as shown at 41 of the aperture 40 in the side bar of FIG. V branch off from the hole or aperture itself weakening the structure in the metal of the side bar surrounding the hole. A further result of a piercing, punching, shaving or other impact type of finishing the holes in the side bars is shown in the left hand hole 45 in the side bar of FIG. V. An incipient stress riser or a fracture 46 may result from such finishing in combination with a break out such as is shown at 47.

A further undesirable result that sometimes occurs in fashioning or forming the side bars with the holes therein is shown in FIG. IV. This is usually a result of a relative misalignment of the punch and die tools with the surface of the side bar so that the holes formed by the punching or finishing operation is out of square with the sides or surfaces of the side bar. The imperfections shown in FIGS. III to VI are exaggerated to more clearly show them but nonetheless greatly effect the fatigue life, the endurance life, and strength capacity of the assembled chain.

It is desirable that the holes or apertures formed in the side bars be smooth, all be of the same diameter, be square with the surface of the side bar, and always the same pitch distance apart as shown in FIG. II. The imperfections as shown in FIGS. III through VI and other imperfections not illustrated are sometimes smoothed over by burnishing or ballizing by forcing a ball through the hole as shown in FIG. IX. The ball 80 being slightly larger than the pierced hole 32 must in all instances follow the angle of the hole, so that if the hole is out of square with the face of the material (as shown in FIGS. IV and IX) little or no corrective action will take place. The burnishing or ballizing will smooth out the walls by pushing or ironing out material to some degree. The degree depends upon the condition of the hole before the ball is forced through it. In any event the punching, piercing, or shaving operations produce tears and fractures in the holes while the ball burnishing pushes material around like bread dough and creates overlaps. Both processes set up incipient stress risers or further fractures which can be enlarged or exaggerated in heat treatment but which directly affect the fatigue life of the side bar as well as the chain. A broaching process of finishing which involves the use of a tool similar to a rounded file being reciprocated in and out of the hole is sometimes utilized. However, this is still an impact type of finishing and gives rise to the incipient stress risers and fractures mentioned above.

These faults in the side bars of the chain shorten the life of the chain, reduce the speed at which a chain can run, and reduce the load the chain can carry. If the holes are not square with the surface then the side bar is flexed when a load is put on the pin and/or bushing and roller. This results because the pin is straightened to a perpendicular position relative to the direction of travel of the chain and if the fault such as is shown in FIGS. III or IV illustrating the taper or out of squareness is present, movement of the pin to its perpendicular position causes the side bar to flex so that more of its load bearing surface is against the load bearing surface of the pin. Repeated flexures, of course, fatigue the metal in the side bars particularly in the places where holes are formed and cause fatigue cracks or fractures which eventually causes failure of the side bar or chain. It is possible for the flexing action of the side bar to occur with a severe break out condition but it is more likely that fatigue failure of the chain, when a fracture or break out is present, is caused by the fact that only a portion of the inside diameter of the hole is contacting the pin or bushings which means that only a portion of the pin and the side bar is carrying the load. This reduces the strength and thus the life of the chain.

To overcome these difficulties a new process or method of making chain is proposed which specifically includes the improvement of the load bearing surfaces of the side bars or other components of the chain. When forming the side bar it is generally the practice to blank out the side bar from strip stock being fed through a punching machine in the shape shown in FIG. I or other desired shapes. Depending upon the size of the side bar the holes or apertures, which receive the pins or bushings, may be formed with an additional set of punches and dies by the same punching operation which blanks out the side bars. The heavier side bars generally are blanked out in the shape desired and then in a second punching operation the holes are formed in the desired position. A flattening step or operation may be utilized after the initial blanking and hole punching operations, again depending upon the material which is utilized to form the side bars and the deformity produced in the side bar by one or both of the first two operations.

The present invention consists of clamping each side bar in a fixture after the initial hole forming operation is performed and then enlarging the hole to a desired diameter by the introduction of a revolving cutting tool, such as a carbide reamer, into the holes to give a desired finish to the hole. Such an operation is illustrated in FIG. X. The side bar 60 has the holes 61 and 62 formed therein, a fault in the form of a break out 63 being shown in the hole 61. The introduction of the revolving cutting tools 71 and 72 into the holes allows, since the side bar 60 is securely clamped in a fixture, the finished holes 61 and 62 to be square with the respective surfaces of the side bar 60. Further, any fractures or break outs are removed by the cutting operation leaving a smooth square-walled hole the diameter of which can be controlled within the tolerances on the order of at least a tenth the tolerances presently accepted in the industry and higher if desired. The reamers 71 and 72 are shown being introduced into the holes 61 and 62 simultaneously from opposite sides of the side bars 60. This advantageously makes sure that the pitch distance as shown in FIG. I between the two holes 61 and 62 is controlled to a high degree of accuracy. The ability to control the pitch distance accurately greatly enhances the life of the assembled chain. The result of such finishing as hereinbefore discussed provides a greater contact area for the pin or bushing which is press fitted into the holes. Further, the fractures or incipient stress risers that may have resulted from the initial hole forming operations are removed entirely. The greater contact area around the pin or bushing will result in a reduced unit stress around these important points in the chain for a given tensile load. With this result goes a greater endurance life of the chain.

Since the parts are clamped in a fixture and the holes will be finished by a revolving tool and not pierced or ballized by impact type finishing methods, squareness of hole to face of the metal will be improved. Since the amount of squareness of hole to face has a direct influence on the degree of flexure of the side bar under tensile load, the degree of deflection as well as the frequency of same has a definite effect on the fatigue life of the side bar as discussed hereinbefore. Since the side bars are the connecting links which make up the assembled chain the perpendicular holes formed therein with respect to the chain increases the fatigue life of the side bar and thus the life of the chain itself will also be increased.

Considering the fact that hole size and finish are improved as well as the amount of squareness of the hole it then falls into line that the pitch of the holes, the distance from center to center of the holes, will also improve. This being the case, it then can be expected that correct uniformity of pitch in chain will be effected. Better pitch control of the chain will reduce vibration where speed is a factor and will produce greater assurance that each component of the chain will carry its share of the load. This condition will increase chain life and particularly so in the leaf type of chain where several side bars make up a single link of chain.

It is further advantageous to include a surface grinding operation for one or both sides of the side bar prior to clamping the side bar in a fastener or fixture for the finishing of the holes with a revolving tool. The surface grinding of the side bar will insure that a perpendicularity will result between the surface of the side bar and the inside walls of the holes since this insures perpendicular clamping and thus perpendicular entry of the revolving tool into the holes.

It is further advantageous to heat treat the side bar to attain the desired degree of hardness prior to the revolving tool finishing as described hereinbefore. However, greatly improved chain will result even if the finishing as described hereinbefore is applied to the holes in the side bar before the heat treating operation.

Thus, there has been presented a method and an improved chain in which undersize holes are punched or otherwise formed in the blanked side bar. The side bar may then be flattened if needed or desired. The side bar is clamped in a fixture and the holes formed therein are enlarged and finished to the desired diameter by the use of a revolving tool such as a carbide reamer. The two holes in a single side bar are advantageously simultaneously finished to improve the pitch accuracy. The side bar may receive a surface grinding step either before or after a heat treating step but prior to clamping the side bar in the fixture. The side bar may be heat treated either prior to the revolving tool finishing of the hole or after the revolving tool finish of the hole, but advantageously prior to the finishing.

In conclusion, it is pointed out that while the illustrated example constitutes a practical embodiment of my invention, I do not limit myself to the exact details shown, since modification of the same may be varied without departing from the spirit of this invention.

Having described the invention, I claim:

The method of making a side bar for chain links comprising the steps of: forming undersize holes through said side bar; forming a planar surface of at least one of the sides of said side bar through which said holes open; thereafter clamping said side bar in a fixture with said planar side parallel to and engaging a surface of said fixture; and thereafter finishing said holes by inserting revolving cutting tools in each of said holes simultaneously, said tools being maintained with their axes of revolution substantially perpendicular to said fixture surface.

References Cited in the file of this patent
UNITED STATES PATENTS

| | | |
|---|---|---|
| 447,814 | Elliott | Mar. 10, 1891 |
| 2,171,262 | Beekman et al. | Aug. 29, 1939 |
| 2,373,901 | Lowery | Apr. 17, 1945 |
| 2,423,223 | Bullard et al. | July 1, 1947 |
| 2,424,087 | Focke et al. | July 15, 1947 |
| 2,444,812 | Crowley et al. | July 6, 1948 |
| 2,994,186 | Morrow | Aug. 1, 1961 |